No. 824,612. PATENTED JUNE 26, 1906.
R. W. BARTLETT.
APPARATUS FOR REDUCING DISLOCATED JOINTS.
APPLICATION FILED MAR. 26, 1904.
8 SHEETS—SHEET 1.
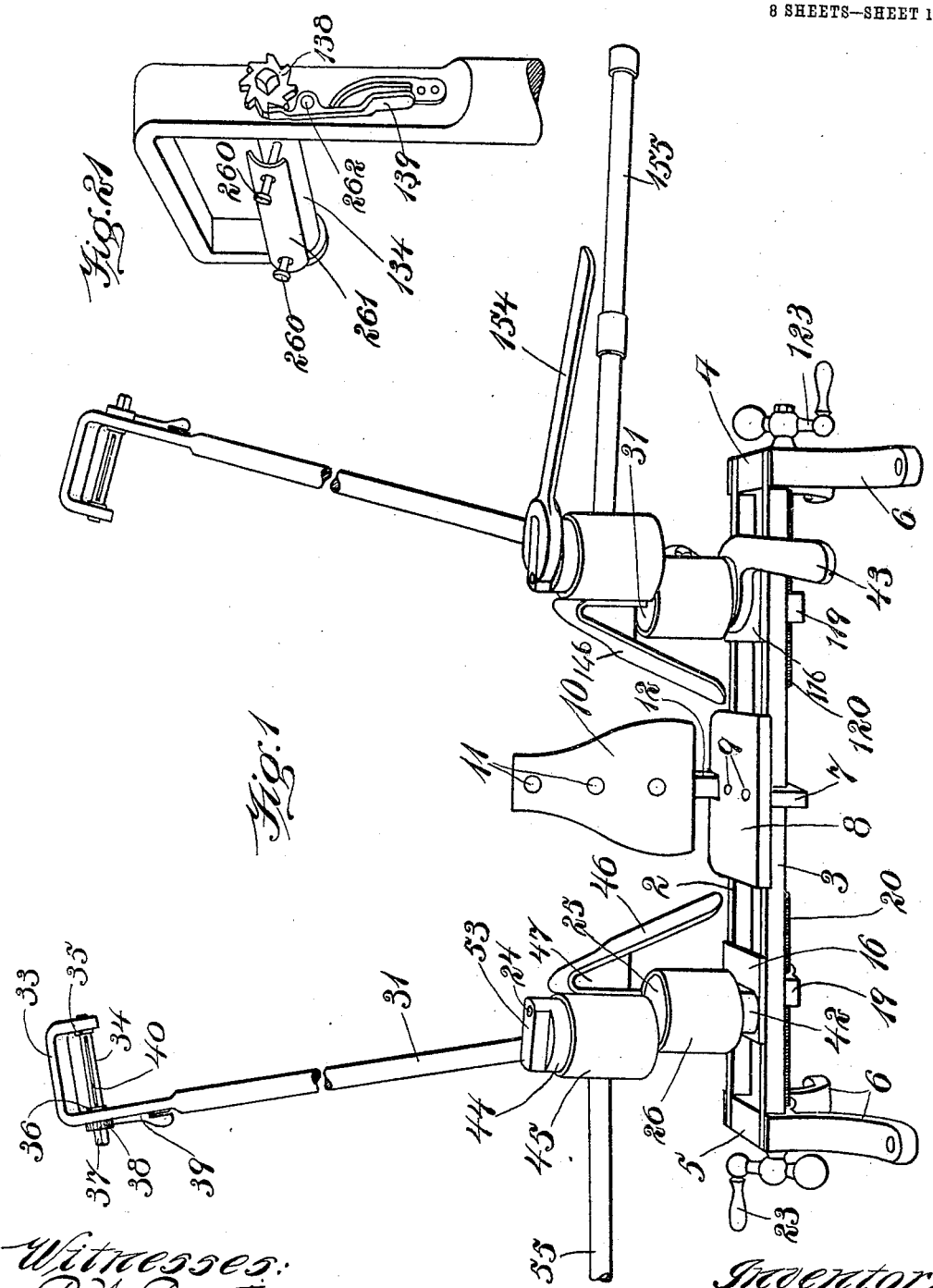
Witnesses:
P. W. Pezzetti
R. Bullock
Inventor:
Ralph W. Bartlett
by Wright Brown & Quinby
Attys

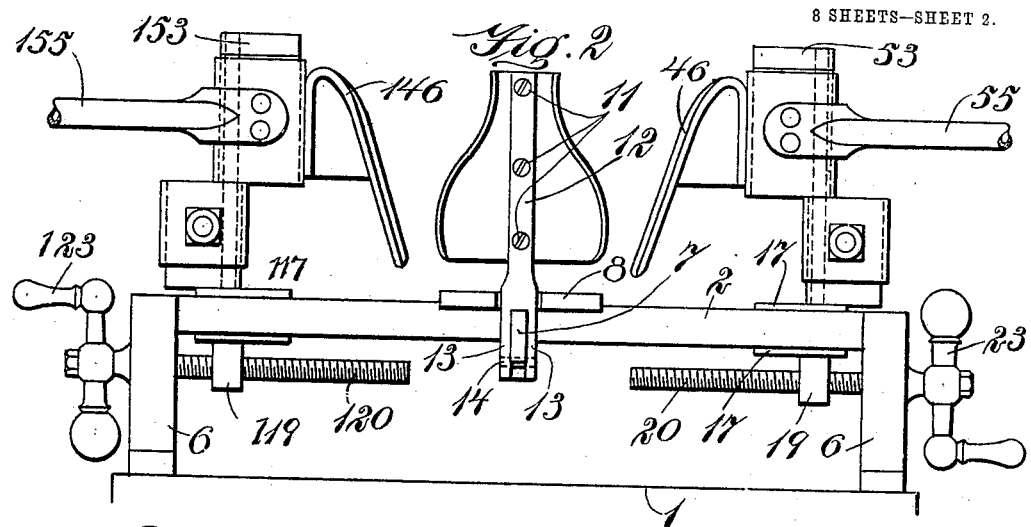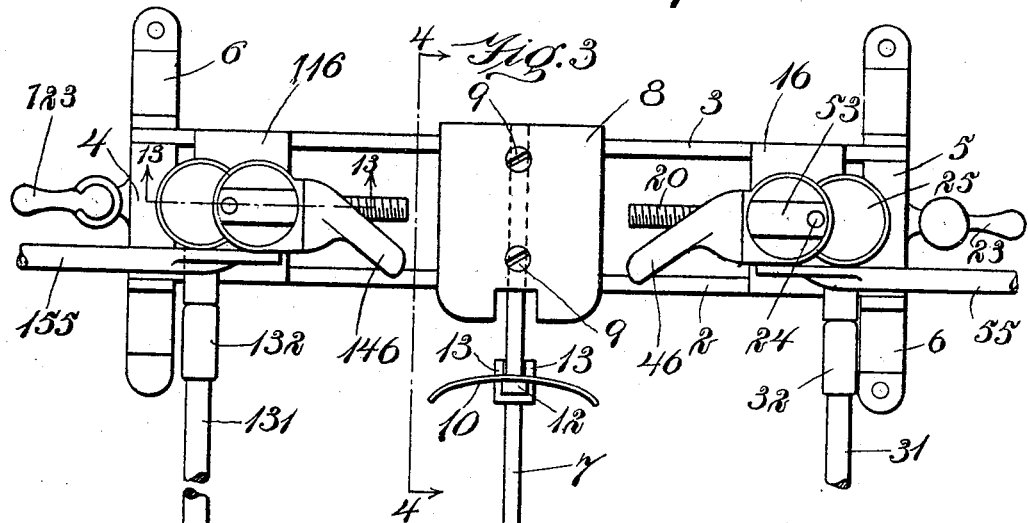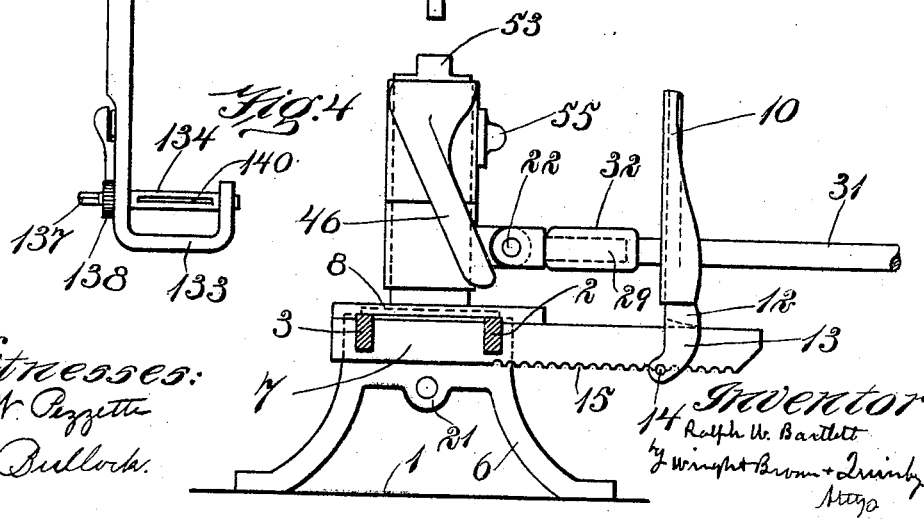

No. 824,612. PATENTED JUNE 26, 1906.
R. W. BARTLETT.
APPARATUS FOR REDUCING DISLOCATED JOINTS.
APPLICATION FILED MAR. 26, 1904.
8 SHEETS—SHEET 3.
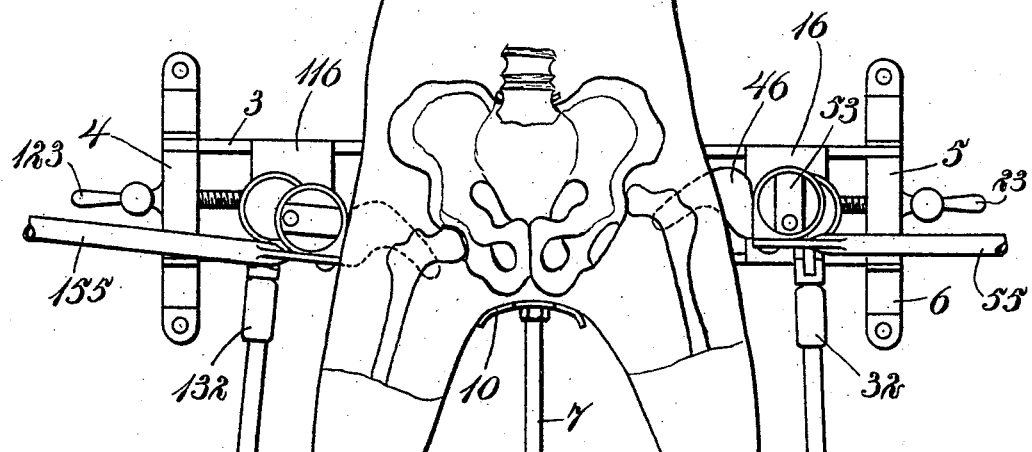
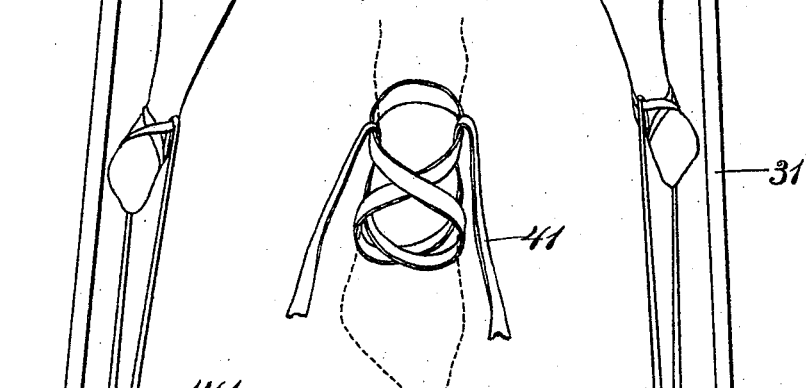
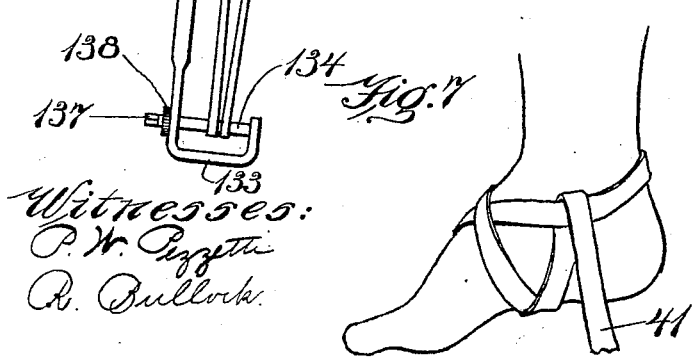

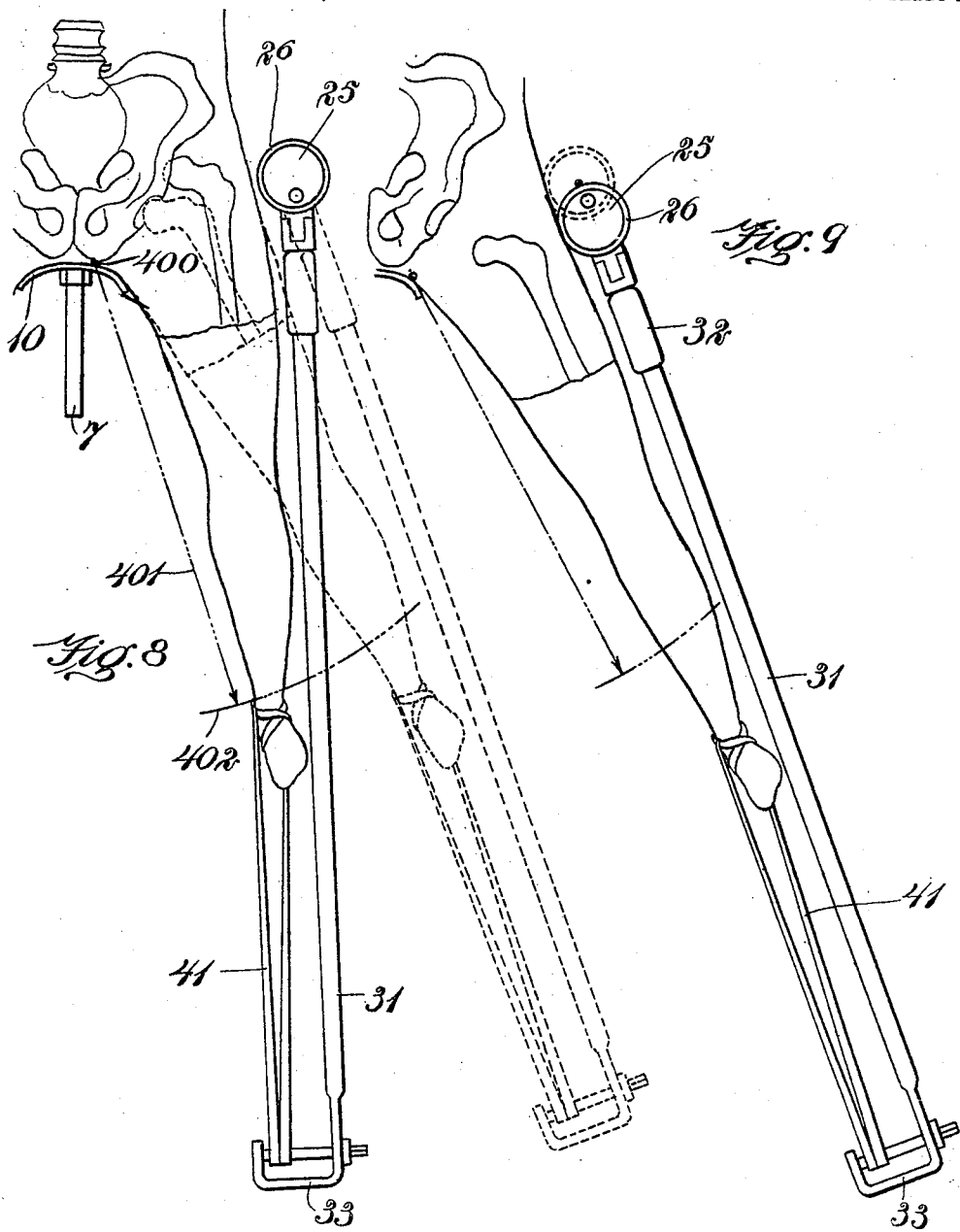

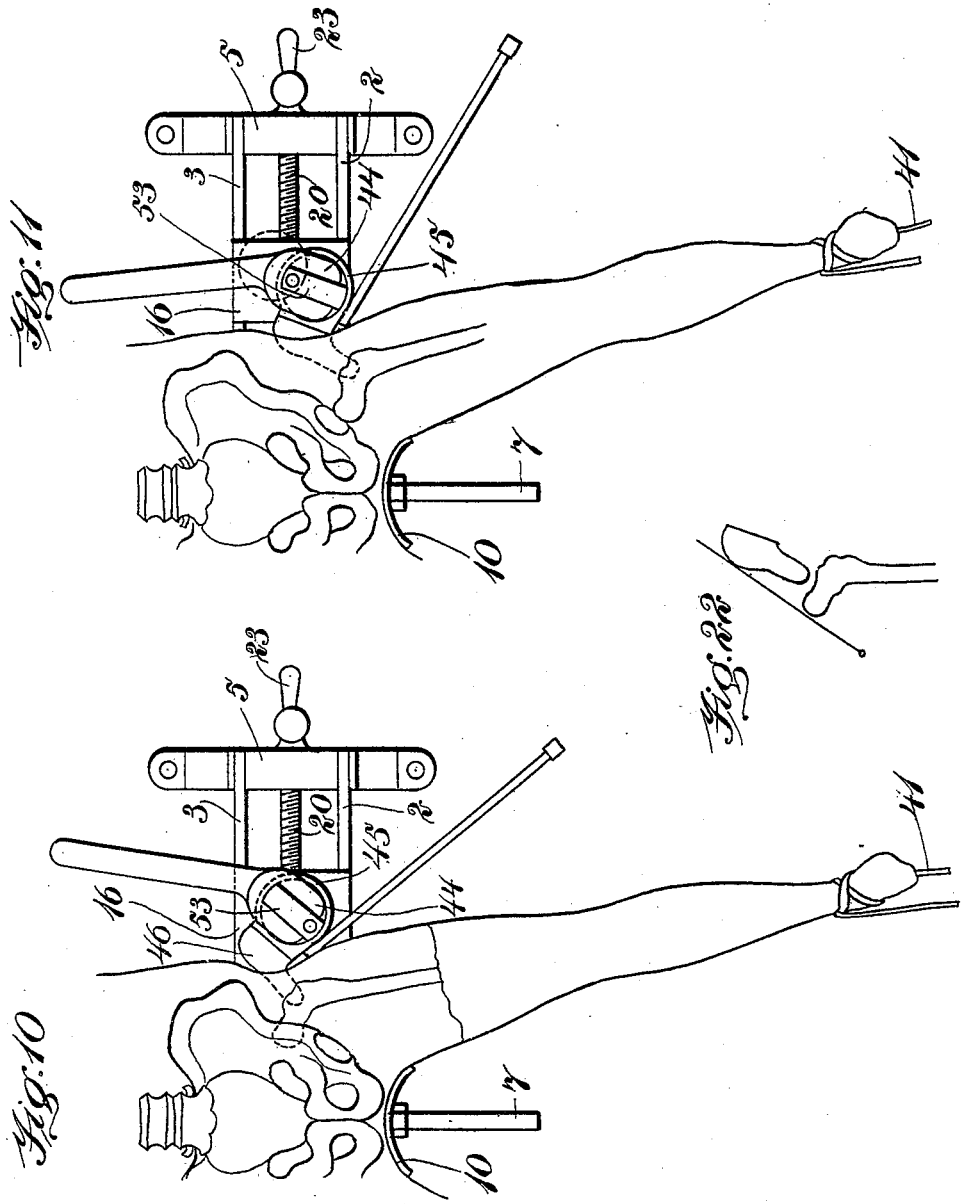

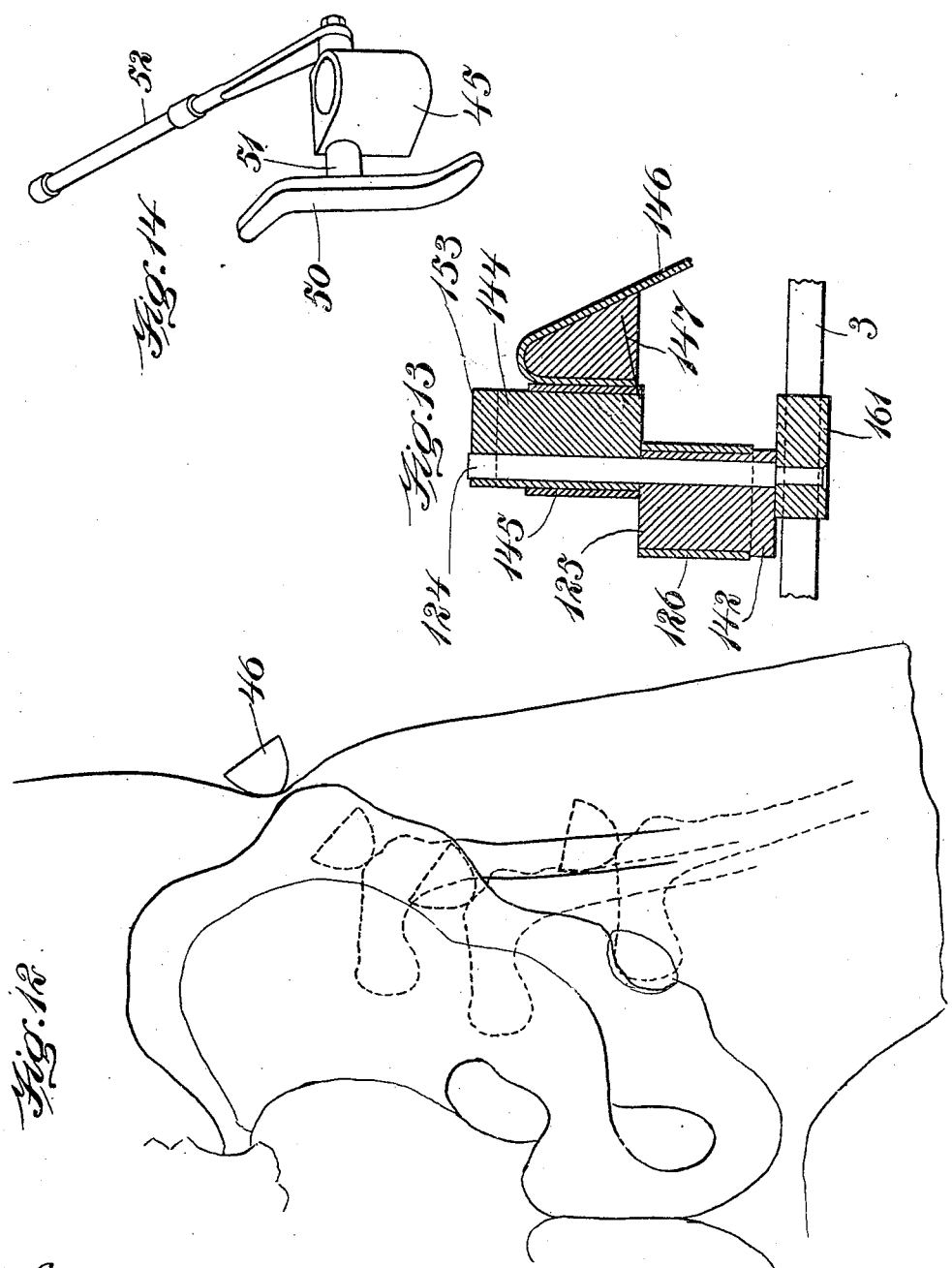

No. 824,612. PATENTED JUNE 26, 1906.
R. W. BARTLETT.
APPARATUS FOR REDUCING DISLOCATED JOINTS.
APPLICATION FILED MAR. 26, 1904.
8 SHEETS—SHEET 7.
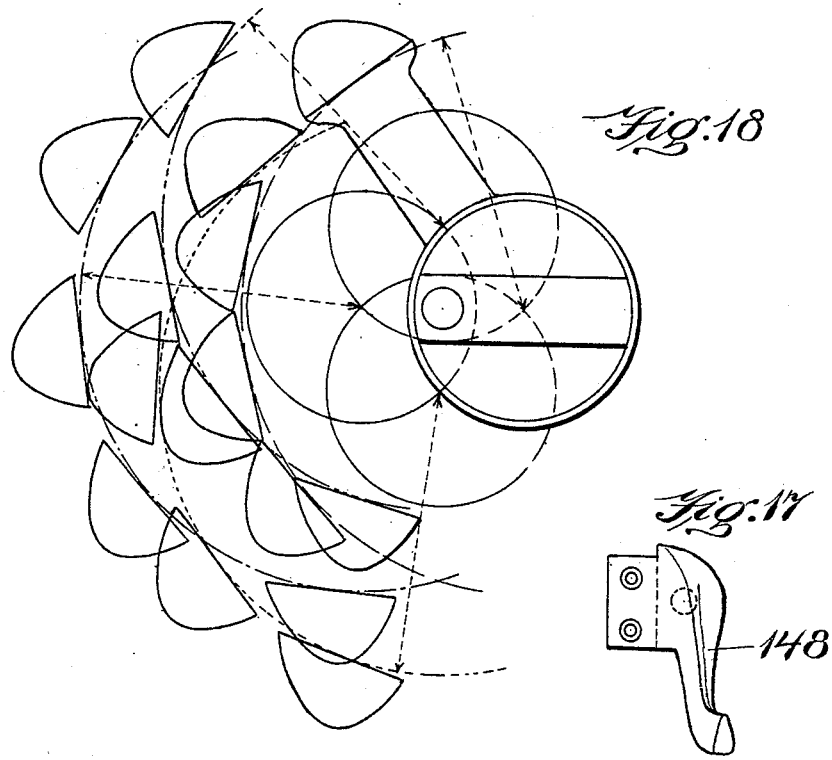
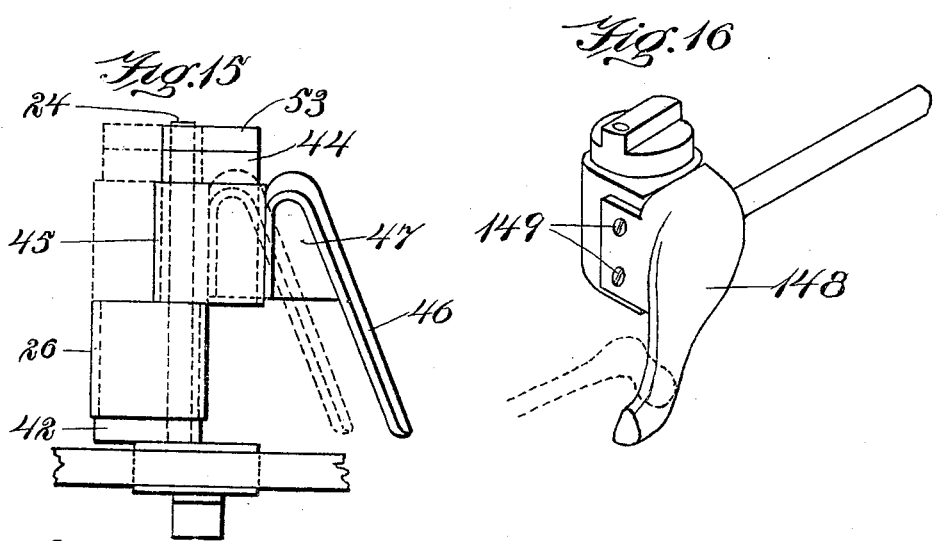
Witnesses:
P. W. Pezzetti
R. Bullock.
Inventor:
Ralph W. Bartlett
by Wright Brown & Quinby
Attys

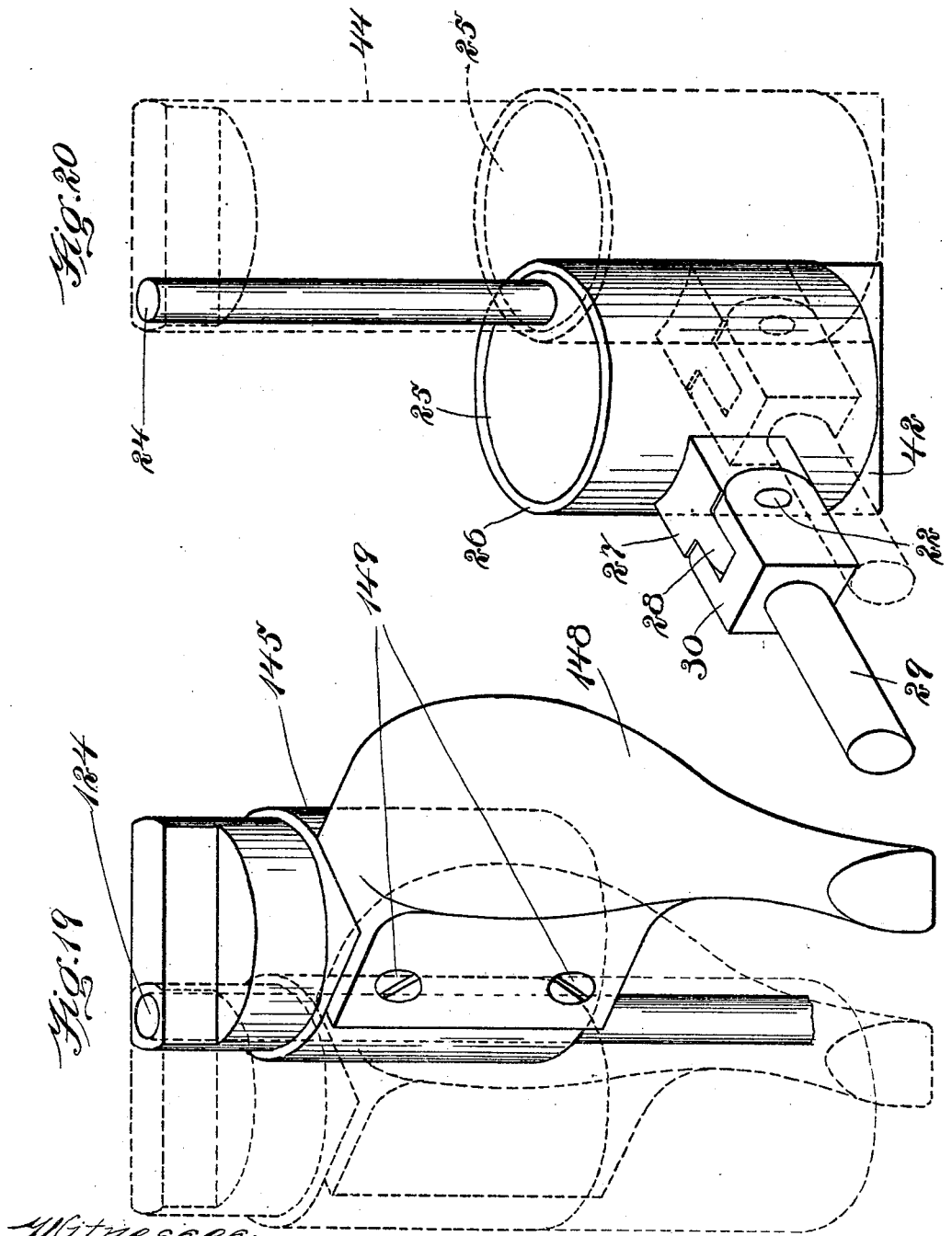

UNITED STATES PATENT OFFICE.

RALPH W. BARTLETT, OF NORTH BROOKFIELD, MASSACHUSETTS.

APPARATUS FOR REDUCING DISLOCATED JOINTS.

No. 824,612.　　　　Specification of Letters Patent.　　　　Patented June 26, 1906.

Application filed March 26, 1904. Serial No. 200,173.

*To all whom it may concern:*

Be it known that I, RALPH W. BARTLETT, of North Brookfield, in the county of Worcester and State of Massachusetts, have invented certain new and useful Improvements in Methods and Apparatus for Reducing Dislocated Joints, of which the following is a specification.

This invention relates to a new and useful method and apparatus for reducing dislocated hips.

Referring to the drawings, wherein there is illustrated one form of my improved machine and means whereby my improved method can be practiced, Figure 1, in perspective and looking down on the machine, shows the frame carrying the saddle with complemental right and left adjustable femur-head deflectors and right and left adjustable femur-head tractors. Fig. 2 represents an elevation of the machine from the opposite side of that shown in Fig. 1, showing the frame carrying the saddle and the complemental right and left femur-head deflectors and tractor eccentrics without the tractor-rods, and also means for adjusting said deflectors and tractors as units. Fig. 3 is a top plan view of the machine. Fig. 4 is a cross-sectional view of the machine on the line 4 4 of Fig. 3 looking in the direction of the arrow toward the left of the machine, showing the means by which the saddle is mounted and adjusted. Fig. 5 is a view similar to Fig. 3, showing, in addition, the outlines of the legs and lower part of the human body in position on the machine and also the bones upon which the machine is designed to operate and the relative positions of the several parts of the machine with relation thereto, the head of the left femur being shown out of place, the right femur being shown in position, due to the action of the right tractor or deflector, or both. Fig. 6 is a detail view showing the method of securing the traction-strap to the foot, the view being taken looking down on the foot. Fig. 7 is a like view looking at the side of the foot. Fig. 8 is a detail view showing the left side of the machine and the relative positions occupied by parts of the machine and the femur. The corrected position of the femur is shown by the dotted lines resulting from the application of the tractor or deflector or the combined application of both the tractor and deflector, the latter not shown. This figure shows the two ways provided for producing traction independent of the tractor-eccentric. Fig. 9 is a view similar to Fig. 8, showing an independent or third traction produced by means of the tractor-eccentric. Fig. 10 is a view similar to Fig. 8, showing the left side of the machine and the relative positions occupied by parts of the machine and of the femur as the latter is engaged by the left femur-deflector. Fig. 11 is a view similar to Fig. 10, showing an independent deflection produced by means of the left-deflector eccentric. Fig. 12 is a detail diagrammatic view showing several positions occupied by the left deflector as the head and neck of the left femur are forced to their proper positions. The several positions taken by the deflector are due to the rotation of the eccentric-strap on its eccentric or to the throw of said eccentric, or both combined. Fig. 13 is a detail sectional view on line 13 13 of Fig. 3, showing the arrangement of the right-deflector eccentric and the right-tractor eccentric and parts carried thereby. Fig. 14 is a detail perspective view of a modified form of the deflector, this particular deflector having a universal motion. Fig. 15 is an elevation of the right-tractor eccentric, the right-deflector eccentric, and the right deflector carried by said eccentric. Fig. 16 is a detail perspective view of another form of deflector, the neck of the right femur being shown in dotted lines above the deflector. Fig. 17 is a view of the deflector shown in Fig. 16 looking directly at the end of the deflector. Fig. 18 is a diagrammatic view of the left deflector and the left-deflector eccentric, showing several positions which the deflector can be made to occupy by turning the deflector eccentric-strap on the deflector-eccentric, or by the throw of the deflector-eccentric, or by the combined action of both. Fig. 19 is a detail perspective view showing the right femur-deflector and its eccentric and eccentric-strap, the dotted lines showing the position of the deflector and its eccentric before the eccentric has been turned on its axis to give its inward throw, the full lines showing the position assumed by the deflector at the extreme inward throw of the eccentric, the deflector eccentric-strap not being turned on the eccentric. Fig. 20 is a detail perspective view of a part of the left femur-tractor and its eccentric and eccentric-strap, the dotted lines showing the position occupied by the parts before the eccentric has been turned on its axis to produce the traction illustrated in Fig. 9, the full lines showing the additional traction produced by the throw of the eccentric, the tractor eccentric-strap not having been turned on said eccentric. Fig. 21 is a detail perspective view of the bow end of the tractor-rod, showing a modified form of clamp for the traction-strap. Fig. 22 is a detail view showing the position of the deflector in relation to the plane of the socket-bone and the head and neck of the femur.

Referring to Figs. 2 and 4, the symbol 1 represents a suitable platform on which the machine may be secured, the parts of the latter being preferably composed of steel. This machine, as shown, is composed of parallel girths 2 and 3, Figs. 1, 2, 3, and 4. The ends of these girths at the right end of the machine are secured in and supported by a standard 4, the ends of these girths at the left end of the machine being secured in and supported by a complemental standard 5, as shown in Fig. 1. The standards 4 and 5 are provided with suitable legs 6 6, by which the machine is secured to and supported upon the platform 1, Figs. 2 and 4. 7 represents a flat steel bar formed with complemental slots in which are arranged the girths 2 and 3, the bar 7 being arranged on the under side of the girths, as shown in Fig. 4. 8 is a plate of sheet-steel forming a seat. This seat is arranged on the top of the girths 2 and 3, over the bar 7 and secured to said bar by means of screws 9 passing down through the seat 8 into the bar 7. By this construction the seat 8 and the bar 7 are rigidly secured to the girths at the central part of the machine, as shown. The seat 8 is adapted to support the lower part of the back of the patient when in position on the machine. 10 represents a saddle secured by screws 11 to a steel bar 12. This bar 12 at its lower end is formed with two parallel fingers 13 13, constituting a fork adapted to slide over and fit the sides of the bar 7. In the ends of the fingers 13 is arranged a pin 14, adapted to engage notches 15 on the under side of the bar 7. (See Fig. 4.) The crotch of the fork is constructed and arranged so that while there is sufficient room between the pin 14 and the crotch of the fork formed by the fingers 13 to permit the bar 12 to be slid along on the bar 7 when the bar 12 is tipped toward the seat, yet when the pin 14 has been placed in any desired notch 15 a slight tip of the bar 12 away from the seat 8 to a vertical position causes the pin 14 and the crotch of the fork to pinch the bar 7, which action, in connection with the action of the notch 15 and pin 14, rigidly secure the saddle at any desired distance from the seat 8.

In the following description the terms "left" and "right" are employed in connection with the machine to designate that side of the machine on which the left and right leg of the patient would be placed to operate upon. As the parts upon the left side of the machine are complemental to and substantially duplicates of the parts on the right side of the machine and each are adapted to operate in a direction toward the saddle, a description of the left side of the machine will suffice for both, the parts on the right side of the machine being distinguished from the parts on the left side of the machine by the numeral "1" prefixed to the numeral indicating the parts on the left side.

Referring to Figs. 1, 2, 3, and 4, 16 represents a sliding base composed of steel. This base is arranged between the girths 2 and 3 and formed upon the sides with lips 17 17, Fig. 2, adapted to rest upon the top and bottom of the girths, as shown. On its under side this sliding base 16 carries a screw-threaded boss 19. 20 represents a screw arranged in the screw-threaded boss 19. Near its outer end this screw 20 is formed as a shaft and is arranged in a suitable bearing 21, Fig. 4, on the under side of the standard 5. 23 represents a handle secured to the outer end of the screw 20. By the construction just described the sliding base 16 can be adjusted toward and away from the seat 8 and secured in any desired position of adjustment. The sliding bases 16 and 116 carry, respectively, the left and right femur deflectors and tractors hereinafter described, each set of right and left deflectors and tractors being arranged as a unit and adjustable as a unit toward or from the seat 8. 24 represents a pintle rigidly secured at its lower end to the sliding base 16. (See Figs. 3 and 20.) 25, Figs. 1, 3, and 20, represents a short steel cylinder formed near its periphery with a suitable cylindrical aperture adapted to receive the pintle 24. The lower end of this cylinder rests upon the sliding base 16. This cylinder 25 so mounted constitutes what I shall term the "left" tractor-eccentric.

Referring to Figs. 1 and 20, 26 is a sleeve arranged upon the eccentric 25 and adapted to be turned on said eccentric as a center, the axis of the eccentric being the pintle 24. The sleeve or eccentric-strap 26 is formed with a lug 27, provided with an ear 28. 29 represents a round pin formed with a fork 30, arranged to straddle the ear 28 and being pivoted thereto by means of a pintle 22. 31, Figs. 1, 3, and 4, represents a steel rod formed at its rear end with a socket 32, Figs. 3 and 4, adapted to fit and turn upon the pin 29. By the above-described construction the rod 31 can be given a universal motion, due to the movement of the fork 30 on the ear 28 in a vertical direction, the movement of the sleeve 26 on the eccentric 25, and the turning of the socket 32 on the pin 29. The rod 31 at its free end is somewhat flattened, Figs. 1, 5, 8, and 9, and bent at right angles on itself and then rearward to form a bow 33. 34 represents a ratchet-spindle one end of which is arranged in a suitable bearing 35 in the end of the bow 33. The opposite end of this spindle is arranged in a suitable bearing 36 in the base of the bow. The free end of the spindle 34 is squared, as at 37, to receive a wrench whereby said spindle may be turned. 38 represents a ratchet-wheel secured on the spindle 34 adjacent the squared end 37. 39 represents a spring-detent adapted to engage the teeth of the ratchet 38 to prevent back motion of the spindle 34. This detent is pivoted to the base of the bow, and, as shown in Fig. 1, is normally in engagement with the teeth of the ratchet, but can be readily released from such engagement. 40 represents a slot in the spindle 34, adapted to receive a traction-strap 41. By the described construction and arrangement means are provided whereby the desired strain may be put upon and maintained upon the traction-strap for the desired period of time, while at the same time such strain may be instantly released, if desired, by means of the spring-detent 39. The lower end of the eccentric 25 is cut away to form a squared nut 42, Figs. 1, 10, 11, and 20. 43 is a wrench having a forked end adapted to engage the nut 42. By this means the eccentric can be moved on the spindle 24 to any desired position of its throw. 44, Figs. 1 and 20, represents a short cylinder formed with a circular aperture near its periphery adapted to receive the pintle 24 and constituting an eccentric, (hereinafter referred to as the "deflector-eccentric.") The deflector-eccentric 44 rests upon the tractor-eccentric 25. 45 represents an eccentric-strap mounted upon the eccentric 44 and carrying a depending arm or lever (hereinafter referred to as the "deflector") adapted to engage the socket-bone and counteract the traction on the femur and is also adapted to engage the femur-neck, so as to assist the traction and force the dislocated femur-head to the desired point. In Fig. 1 this deflector is shown as a bar 46, secured at one end to the eccentric-strap 45, then bent downward over a block 47, secured in place in the angle in the bar. By this construction the free end of the deflector can be given a predetermined spring or yield, depending upon the material employed, the thickness and temper of the metal, the shape and position of the block 47, &c.

In Figs. 16, 17, and 19 the deflector is shown as a rigid arm 148, secured by screws 149 to the eccentric-strap 145, while in Fig. 14 the deflector is shown as a lever of the first class, 50, formed between its ends with a pintle 51, arranged in a suitable bearing in the eccentric-strap 45. To the free end of the pintle 51 is secured a handle 52, by which the pintle 51 can be rocked and a vertical motion imparted to the lower end of the deflector 50. The upper end of the eccentric 44 is cut away to form a squared nut 53, adapted to be engaged by a suitable wrench 54, whereby the eccentric may be turned on the pintle 24 to give an additional throw to the deflector beyond what would be secured by the turning of the eccentric-strap 45 on its eccentric 44. 55, Figs. 1, 2, 3, 4, 5, 10, and 11 represents a handle secured to the strap 45, by which the latter can be turned independently of the motion given to said strap by means of the movement of the eccentric itself about the pintle 24. It will be seen that the handle 55, eccentric-strap 45, and deflector 46 constitute a lever of the first class whose fulcrum is the eccentric 44. From the foregoing it will be seen that the deflector 46 in the form shown in Fig. 1 has two motions, one imparted to it by the rotation of the eccentric-strap 45 about the eccentric 44 by means of the handle 55 and the second due to the throw of the eccentric 44 by turning the latter on the pintle 24. This is also true of the form of deflector shown in all of the figures with the exception of Fig. 14. In this latter figure, in addition to the two motions already described, a third or additional up-and-down motion can be given to the deflector 50 by means of the handle 52.

Referring to Fig. 21, the ratchet-spindle shaft 134 instead of a slot to receive the traction-strap carries two parallel pins 260, upon which is slidingly mounted a plate or clamp 261. In this construction the traction-strap is passed between the clamp 261 and the spindle 134, then over the clamp 261 to the foot. The pull on the traction-strap causes the clamp to bind the strap between the clamp and spindle after the manner of a "cinch." In this figure is also shown the pivot 262 of the spring-detent 139. In cases of dislocated hips the whole leg is removed as far from its normal position as is the dislocated head from its socket in the pelvis. Consequently in order to reduce the dislocation it is necessary to pull the whole leg in the desired direction a distance corresponding to the distance of the dislocated head from its socket. In order to do this, it is necessary to hold the pelvis of the patient while applying traction and motion to the leg and at the same time direct and force the head back to the socket. By my invention the operator, without muscular exertion and at all times unhampered by any necessity for confining his attention to any particular part of the machine, is enabled to hold the pelvis, pull the whole leg as desired, move the whole leg, as may be necessary, and guide the head of the femur in the desired direction while the leg is subjected to the predetermined forces necessary to overcome all obstacles to the reduction. The tractor and deflector forces can be instantly increased or diminished, so that in guiding, directing, and forcing the dislocated head to its socket the operator is enabled through the medium of the machine alone not only to exert, but absolutely maintain, the desired force in the desired direction.

Referring to Fig. 5, the body of the patient is first placed upon the machine so that the sacrum is supported by the seat 8. (See Fig. 1.) The saddle 10 is then adjusted between the legs of the patient, so as to engage the bones of the pelvis and hold the pelvis when traction is applied to the legs or to either of them. The traction-straps are secured to feet and ankles, as shown in Figs. 6 and 7. The ends of the traction-straps are threaded through the slots 40 and 140 in the spindles 34 and 134 or between the clamps 261 261. (See Fig. 21.) The spindles are then turned, and traction is applied. Slight traction upon the leg that is not being operated upon tends to steady the pelvis of the patient. The right and left deflector units hereinbefore described are adjusted by means of the screws 20 and 120 in their proper positions at each side of the pelvis of the patient. The pelvis is now secured against the saddle-seat 10 by traction on both legs and held at each side by the deflectors 46 and 146. Additional traction pull is obtained as desired by means of the ratchet by moving the tractor-rod 31 substantially as indicated in Fig. 8 and also by means of the tractor-eccentric, (shown in Figs. 9 and 20,) or all combined.

Referring to Fig. 8, it will be observed that the tractor-rod and the leg swing on different centers, that of the leg being represented by the pelvis and that of the rod by the pintle 24. Practically the point marked 400, Fig. 8, where the pelvis would engage the saddle but for the interposed tissue, may be considered as the center of motion for the leg, since the tractor-muscles are on the inside of the leg, and it is these muscles that require usually the greater traction. With the parts positioned as in Fig. 8 the arrow-line 401 and circle-line 402 show the position a particular part of the leg would assume in respect to the part 400 if uninfluenced by the tractor. The dotted-line position of the foot in Fig. 8 shows the additional traction produced by moving or swinging the tractor-rod outward or in any direction that increases the distance between the fixed point 400 and the circle-line 402. The universal movement of the tractor-rod permits the production and maintenance of such additional traction in any desired direction and to any desired amount or point. While the leg is pulled and manipulated by means of the tractor the head of the femur is directed and forced by means of the deflector 46 or 146 to its socket, substantially as shown in Figs. 5, 10, 11, 12, 13, and 16.

The movable deflector 148 (shown in Figs. 16, 17, and 19) engages the upper extremity of the femur at or near the great trochanter, and one of its functions is to act as a fulcrum, on which the femur is operated as a lever of the first class, the power end of the lever—that is, the shaft of the femur—being held by the traction exerted by means of the traction-rod 31. The weight end of the lever—that is, the dislocated head—is then forced between and through the obstructing tissues while they are kept taut by traction, and thus prevented from intervening between the head of the femur and the socket, as they would if they were allowed to remain loose. Another function of the deflector is to engage the pelvis at the side and, together with the saddle, prevent the pelvis from moving either forward or sidewise when traction is applied to the leg as hereinbefore described. The third function of the deflector is afforded by reason of the motions of which it is susceptible in consequence of its being attached to or made a part of the eccentric-strap 145, which is controlled by the handle 155, and in consequence of the motions imparted thereto by means of the deflector-eccentric 144, operated by the wrench 54. The third function is performed by the deflector at a time when it is also performing its other functions and consists in moving and directing the upper extremity of the femur, so as to enable the operator to readily insert the dislocated head into the socket where it belongs. The femur-bone acts as a lever of the second class. The deflector acting as a fulcrum between the trochanter and head of the femur enables the operator, by means of the tractor-rod and deflector, to force the head of the femur through the ligaments, as he would not be able to do without the aid of the deflector, there being nothing otherwise to steady and hold the femur at the desired point. Should the operation fail to effect a reduction by this means alone, the failure will be due to the conditions immediately surrounding the joint—that is to say, ligaments or tissue may intervene between the head of the femur and the socket, rendering it necessary for the operator to maneuver the dislocated bone so as to overcome the obstacle imposed by the intervening tissues. The approved form of deflector 148, as shown in Figs. 16, 17, and 19, is especially adapted to aid the operator in this emergency, the deflector being held in any desired position with relation to the saddle-seat which holds the pelvis, and in relation to the dislocated bone forms a fulcrum which prevents the head from slipping away and at the same time enables the operator to forcibly thread the head between and through intervening tissues by applying appropriate motions to the tractor-rod. (See Fig. 22.) The fulcrum or deflector in this case being movable places additional means under the control of the operator at all times for effecting the desired result, the tractor-rod 31 being movable back and forth, as desired.

The eccentric-strap 26, playing upon the tractor-eccentric 25, the hinged joint formed by the parts 22, 27, 28, and 30, as shown in Fig. 20, and the rotary motion supplied to the tractor-rod by the pin 29 and the sleeve at the end of the tractor-rod furnish universal motion to said rod, which carries the attached leg with it wherever it goes, thereby enabling the operator to flex, extend, abduct, adduct, and rotate the leg while under traction and while the deflector is being operated, if desired.

Manifestly this method and the hereinbefore-described method and machine may be employed for reducing dislocated shoulder-joints as well as dislocated hip-joints.

I believe myself to be the first to reduce dislocated joints by either the method or machine hereinbefore described and desire to claim the same in the broadest possible legal manner.

Having thus explained the nature of my invention and described a way of constructing and using the same, though without attempting to set forth all of the forms in which it may be made or all of the modes of its use, what I claim, and desire to secure by Letters Patent, is—

1. In a machine for reducing dislocated joints, a socket-bone support, and means for deflecting the dislocated end of the bone.

2. In a machine for reducing dislocated joints, a socket-bone support, means for applying traction, and means for deflecting the dislocated end of the bone.

3. In a machine for reducing dislocated joints, a socket-bone support, and means whereby the end of the dislocated bone may be given any desired movement of translation or position.

4. In a machine for reducing dislocated joints, means for straightening the tendons or other tissues about the socket and forcing the dislocated end of the bone into its socket, and means for varying the direction and intensity of the force exerted by said first-mentioned means.

5. In a machine for reducing dislocated joints, socket-bone-holding means, a tractor device and a deflector device arranged on a common axis.

6. In a machine for reducing dislocated joints, socket-bone-holding means, a support arranged in definite relation to said means, an eccentric carried by said support, a tractor-rod and connections between said rod and eccentric.

7. In a machine for reducing dislocated joints, socket-bone-holding means, a support arranged in definite relation to said means, an eccentric carried by said support, a deflector and connections between said deflector and eccentric.

8. In a machine for reducing dislocated joints, a support, an eccentric carried thereby, an eccentric-strap arranged on said eccentric, and a deflector carried by said strap.

9. In a machine for reducing dislocated joints, a support, a spindle carried by said support, two eccentrics carried by said spindle as an axis, one over the other, a tractor-rod connected to one eccentric, a deflector connected to the other eccentric.

10. In a machine for reducing dislocated joints, socket-bone-holding means, a tractor device and a deflector device arranged upon a common axis, and provisions for controlling the direction and intensity of the forces applied thereby.

11. In a machine for reducing dislocated joints, a socket-bone support, and a movable bar or device for applying traction, whereby the member under traction can be given a movement of translation in any direction to change the position of the head of the bone with relation to its socket.

In testimony whereof I have affixed my signature in presence of two witnesses.

RALPH W. BARTLETT.

Witnesses:
 R. BULLOCK,
 A. C. RATIGAN.